United States Patent [19]
Hamann

[11] 3,827,097
[45] Aug. 6, 1974

[54] DEVICE FOR WASHING AND COILING HOSES

[76] Inventor: Raymond J. Hamann, Rt. No. 3, Box, La Grande, Island City, Oreg. 97202

[22] Filed: Feb. 26, 1973

[21] Appl. No.: 335,664

[52] U.S. Cl.............. 15/40, 134/122, 134/141, 242/86
[51] Int. Cl.............. B65h 75/34, D06g 1/00
[58] Field of Search........... 15/40, 88; 134/64, 122, 134/141, 199; 242/86

[56] References Cited
UNITED STATES PATENTS

| 689,060 | 12/1901 | Britton | 134/122 |
| 1,790,756 | 2/1931 | Lowery | 134/122 |
| 2,315,085 | 3/1943 | Churchward | 242/86 X |
| 3,471,885 | 10/1969 | McLoughlin | 15/40 |

FOREIGN PATENTS OR APPLICATIONS

| 11,917 | 5/1913 | Great Britain | 15/40 |
| 660,663 | 5/1938 | Germany | 242/86 |
| 887,453 | 8/1953 | Germany | 15/40 |

*Primary Examiner*—Daniel Blum

[57] ABSTRACT

Hose washer and spindle structure wherein a hose, such as a fire hose or an agricultural irrigation hose, may be simultaneously washed and also wound in coil form upon a spindle.

The subject structure includes a washer and guide chamber having provision for inwardly directed water sprays. The guide chamber is aligned with but positioned remote from a spindle that revolves and hence wraps or winds the hose as the same proceeds through the guide chamber. The structure is designed for a maximum stability during the washing and wrapping operation.

4 Claims, 5 Drawing Figures

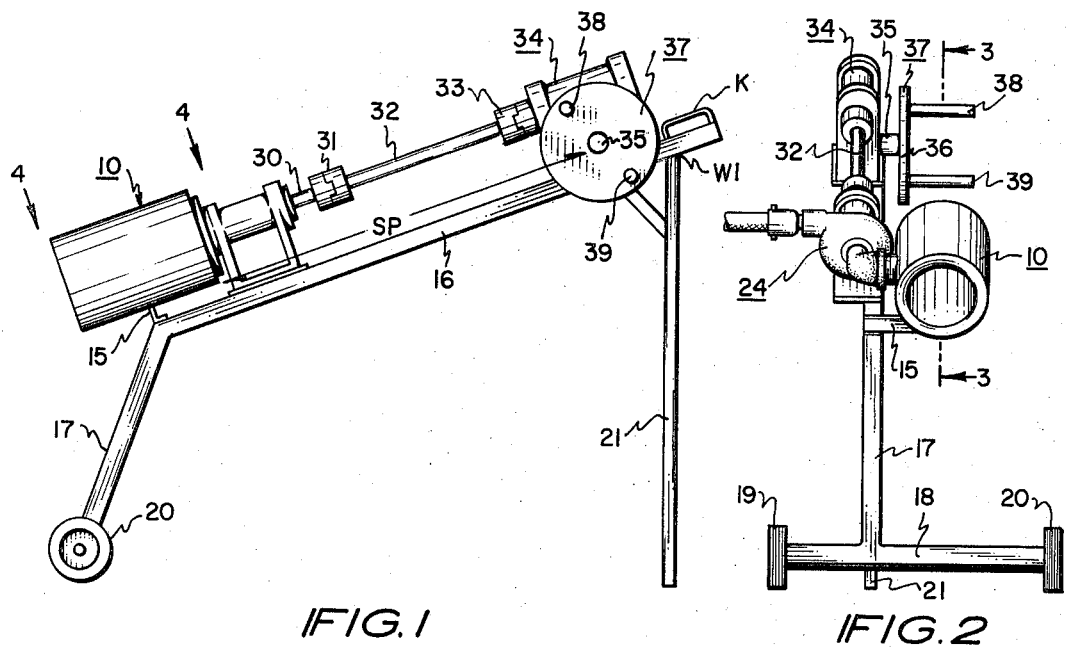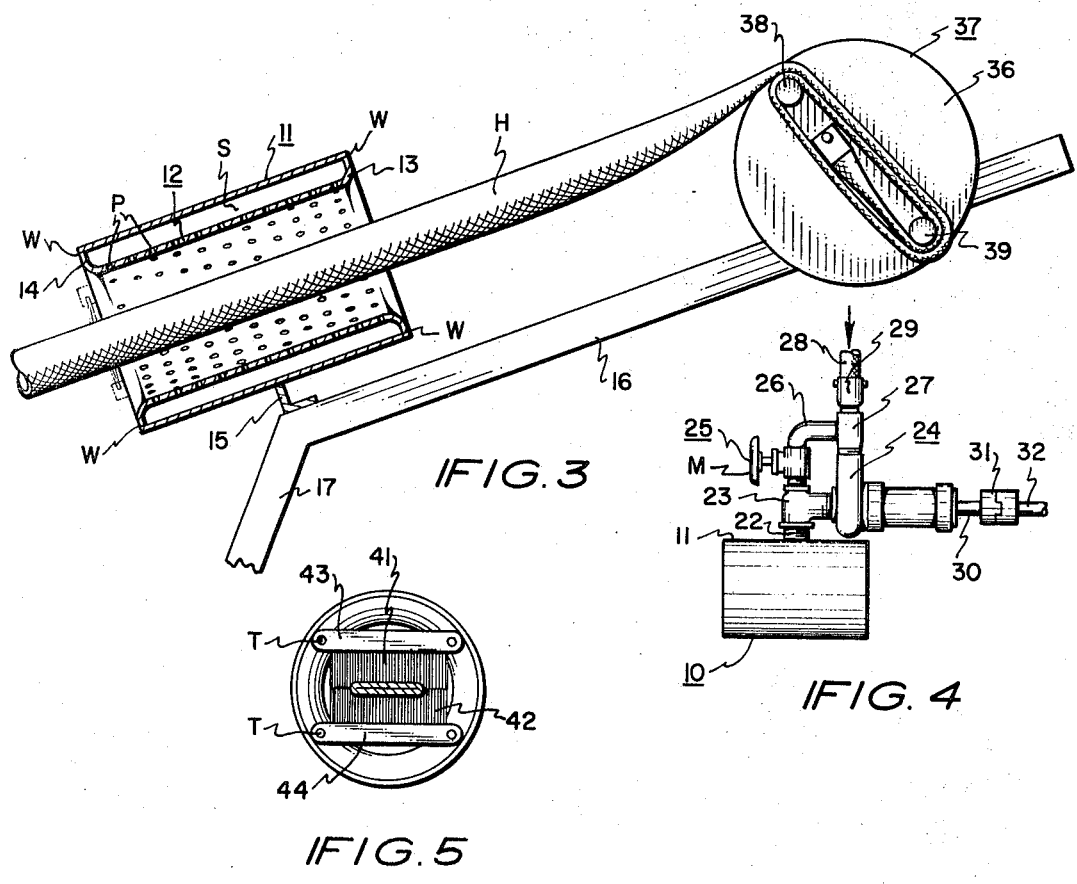

DEVICE FOR WASHING AND COILING HOSES

The present invention relates to washing equipment for hoses such as agricultural and fire hoses and, more particularly, provides a suitable portable structure incorporating a combination washing and guide chamber suitably supported, and this with a revolving reel or spindle accommodating wrapping of a hose.

In the present invention the washer and guide chamber preferably comprises inner and outer cylinders forming an interior space, with the inner cylinder being made perforate. A fluid motor is attached to the structure and its fluid output is made to flow into the interior between the two cylinders so as to supply the spray jets required. The fluid motor is adjustable as to the speed so that the shaft connected thereto may have a variable speed characteristic. A right angle gear box connects such shaft to a revolving spindle. The plane of revolvement of the latter is combined with the guide chamber so that the chamber not only serves to provide a washing of the hose preparatory to its wrapping on the spindle, but also as a guide or constraining structure to facilitate actual wrapping of the hose upon the spindle.

The shaft coupling between the motor and right angle gear box of the spindle is made sufficiently elongate so that guide function is accomplished effectively.

Accordingly, a principal object of this invention is to provide a new and improved guide and washer structure for hoses.

An additional object is to provide a washer and guide structure wherein a hose is to be wrapped is to be simultaneously washed preparatory to the actual accomplishment of the wrapping function.

An additional object is to provide in a washer structure a spindle physically separated from the guide portion, this with an elongate shaft coupler and right angle gearing structure, so that the spindle may be made physically separate from and yet aligned with the combination washer and guide chamber of the structure.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a side elevation of one form of the present invention in a preferred invitement thereof.

FIG. 2 is an end view taken from the left hand side of FIG. 1.

FIG. 3 is enlarged fragmentary view, illustrating the passage and wrapping of the hose used relative to the device.

FIG. 4 the plan view taken along the line 4—4 in FIG. 1.

FIG. 5 is the left hand view of the washer and guide chamber where brushes are installed.

In FIG. 1 washer and guide chamber 10 is comprised of inner and outer concentric tubular members in the form of an outer housing 11, see FIG. 3, and also an inner perforate shell 12. The ends 13 and 14 of the latter are flared outwardly and welded at W to the opposite ends outer housing 11. A multiplicity of perforations P are disposed through the inner shell 12 to provide for an annular pattern of radially directed water sprays for cleaning impingement upon hose H. Chamber 10 is mounted by bracket 15 to elongate or support 16. Depending from the lower extremity of longate support 16 is a leg 17. The latter is fastened to horizontal axle 18 which receives wheels 19 and 20 at its opposite ends. An elongate prop rest 21 is vertically oriented and welded at W1 to the elongate support 16.

Connected to outer housing 11 and communicating with the interior S, between outer housing 11 and inner shell 12, is a conduit 22. The same is connected by an L-fitting 23 to fluid motor 24. Manually operable valve 25 is teed into line 26 the latter of which communicates with inlet fitting 27. Auxiliary inlet water hose 28 is connected by fitting 29 to fitting 27 in the manner illustrated in FIG. 4. Motor 24 includes an output shaft fitting connected by engagement fitting 31 to an elongate shaft coupler 32. Engagement means 33 connects the shaft coupler to right angle gear box 34. The latter includes an output shaft, designated a spindle shaft at 35, which connects to spindle plate 36 of spindle 37. Spindle 37 includes the usual, spaced prongs 38 and 39 which receive a hose to be washed and wrapped in the manner shown in FIG. 3.

If desired, and as an auxiliary feature, there may be provided a pair of brushes 41 and 42 which can be mounted by brush-head means 43 and 44 to the composite chamber 10 as by attachments T. These brushes are used for an actual brush-type cleaning of the hose H to be wrapped.

Valve 25 in FIG. 4 is a bypass valve and serves as a speed control for controlling the speed of movement of the fluid motor 24 at shaft 30 and a shaft coupler 32. Sufficient space at SP is provided to allow for water sprayed under the hose H to tend to drop off or otherwise to become separated from the hose prior to its winding upon spindle 37. A handle K is welded to the longated support 16 in the manner illustrated, and serves as a convenient manual aid for transporting the device on its wheels 19 and 20.

In operation the user, either before or after turning on the water, will route the hose H through the guide chamber 10 and effect an initial wrap thereof upon spindle 37 as shown in FIG. 3. In any event, once water pressure is applied to hose 29 in FIG. 4, the user effects simultaneous washing of the hose, intermediate the guide chamber 10 by the series of the water sprays proceeding radially toward the hose through apertures P, and also a wrapping of the hose about spindle 37, of conventional design, via the shaft connections and right angle gear box 34. The speed of revolvement of the output shaft of the fluid motor, as well as that of the elongate shaft coupler 32, may be regulated by controlling the passage way of bypass valve 25, by turning its handle M as seen in FIG. 4.

Once the hose has been completely wrapped on the spindle then the water at 29 is simply turned off its source.

Where desired, brushes may be installed as shown in FIGS. 3 and 5.

I claim:

1. A combination hose washing and winding machine including, in combination, a washer and guide chamber having a central passageway axis and comprising inner and outer, medially spaced tubular members connected together at their opposite ends, said inner member including a multiplicity of water-spray perforations; inclined support structure for supportingly mounting said chamber at a lower region thereof; a spindle rotatably supported by said support structure at an upper region thereof and aligned as to plane of revolvement with said chamber as to the latter's axis; a right-angle gear box mounted to said support structure and having input means and also an output drive connected to said spindle for revolving the latter; a fluid motor spaced from said gear box and mounted to said support structure, said fluid motor having an inlet for receiving pressured fluid and also an outlet coupled with said chamber to provide spray fluid therewithin; and elongate shaft means for mechanically coupling said fluid motor with said input means of said right-angle gear box, to drive the latter.

2. Structure according to claim 1 wherein said inclined support structure includes a handle, a forward depending prop, and rearwardly disposed wheel means dependingly supported from said support structure.

3. Structure according to claim 1 wherein said washer and guide chamber includes upper and lower, fixed, horizontal brush means for encompassingly engaging an external hose to be routed through said washer and guide chamber for washing and roll-up purposes.

4. A combination hose washing and winding machine including, in combination, a washer and guide chamber including a central passageway having a central through-aperture, said central passageway being constructed for the reception of an external hose to be routed through said washer and guide chamber at said central passageway, said washer and guide chamber comprising inner and outer, medially spaced, tubular members connected together at their opposite ends whereby to form an annular water reception chamber disposed between said tubular members, said inner member including a multiplicty of water-spray, transverse perforations; angulated support structure for supportingly mounting said chamber at a lower region thereof; a spindle rotatably supported by said support structure at an upper region thereof and aligned as to plane of revolvement with said chamber as to the latter's axis; a right-angle gear box mounted to said support structure and having an input means and an output drive connected to said spindle for revolving the latter; a fluid motor spaced from said gear box and mounted to said support structure proximate said chamber, said fluid motor having an inlet for receiving pressured fluid and an outlet connected to said chamber to provide fluid communication therewithin; and elongated shaft means for mechanically coupling said fluid motor with said input means of said right-angle gear box, to drive the latter.

* * * * *